United States Patent [19]

Pagen et al.

[11] Patent Number: 4,871,605
[45] Date of Patent: Oct. 3, 1989

[54] INORGANIC FIBER MAT BASED BITUMINOUS SHEET MATERIALS

[75] Inventors: Charles A. Pagen, Hurst, Tex.; George Stepien, Jr., Montclair, N.J.; Paul A. Morris, Bedford, Tex.

[73] Assignee: Genstar Building Materials Company, Irving, Tex.

[21] Appl. No.: 520,843

[22] Filed: Aug. 5, 1983

[51] Int. Cl.⁴ ............................................. B32B 9/00
[52] U.S. Cl. .................................... 428/141; 428/150; 428/224; 428/284; 428/291; 428/489
[58] Field of Search ............... 428/291, 224, 284, 286, 428/141, 156, 489

[56] References Cited

U.S. PATENT DOCUMENTS

| | | |
|---|---|---|
| 3,015,582 | 1/1962 | Simison . |
| 3,096,196 | 7/1963 | Bettoli et al. . |
| 3,207,619 | 9/1965 | Klimboff . |
| 3,305,509 | 2/1967 | Waterman et al. . |
| 3,404,108 | 10/1968 | Regenstein et al. . |
| 3,547,674 | 12/1970 | Draper et al. . |
| 3,900,102 | 8/1975 | Hurst . |
| 3,930,100 | 12/1975 | McDonald . |
| 3,937,640 | 2/1976 | Tajima et al. . |
| 4,039,706 | 8/1977 | Tajima et al. . |
| 4,055,453 | 10/1977 | Tajima et al. . |
| 4,097,644 | 6/1978 | Evensen et al. . |
| 4,145,322 | 3/1979 | Maldonado et al. ................ 428/489 |
| 4,219,603 | 8/1980 | Thun .................................. 428/265 |
| 4,220,500 | 9/1980 | Baba et al. . |
| 4,233,356 | 11/1980 | Jacobs . |
| 4,248,926 | 2/1981 | Tajima et al. ........................ 428/489 |
| 4,258,098 | 3/1981 | Bondoc et al. . |
| 4,282,127 | 8/1981 | Desqouilles . |
| 4,342,804 | 8/1982 | Meynard . |
| 4,357,377 | 11/1982 | Yamamoto . |
| 4,362,780 | 12/1982 | Marzocchi et al. ................. 428/283 |
| 4,368,228 | 1/1983 | Gorgati . |
| 4,374,687 | 2/1983 | Yamamoto . |
| 4,405,680 | 9/1983 | Hansen ............................... 428/141 |
| 4,440,816 | 4/1984 | Uffner ................................. 428/268 |
| 4,468,430 | 8/1984 | Ruede ................................. 428/283 |
| 4,472,243 | 9/1984 | Bondoc et al. ..................... 428/141 |

FOREIGN PATENT DOCUMENTS 1440011 6/1976 United Kingdom .

*Primary Examiner*—Edith Buffalow
*Attorney, Agent, or Firm*—Brumbaugh, Graves, Donohue & Raymond

[57] ABSTRACT

An improved inorganic fiber based roofing shingle for use in both high and low temperature environments is prepared by pre-coating an inorganic fibrous substrate with a polymer/bitumen composition prior to the application of a conventional asphalt or bitumen top coat, wherein the polymer content of the bitumen/polymer pre-coat composition ranges from about 3 to 99% by weight.

10 Claims, No Drawings

INORGANIC FIBER MAT BASED BITUMINOUS SHEET MATERIALS

BACKGROUND OF THE INVENTION

The present invention relates to a novel and improved material useful as a building sheet material, such as roofing shingles, siding or the like. More particularly, this invention relates to a bituminous sheet material comprising an inorganic fiber mat substrate saturated with a bituminous composition, which sheet material possesses improved physical properties for handling and durability, particularly in lower temperature environments.

Bituminous sheet materials, such as roofing felt or shingles which are useful in sealing exterior building surfaces, are generally composed of a support layer or substrate, traditionally a felted, fibrous membrane which is saturated with a water-proofing agent, such as an asphalt or bituminous composition. While the asphalt or bitumen is still in a plastic state, granular materials which are opaque to ultraviolet light are ordinarily pressed therein on the weather-exposed face to protect the bitumen from the ultraviolet rays or actinic effects of the sun, as well as to form a decorative coating. The granular material further acts to protect the asphalt or bitumen coating which would otherwise deteriorate producing cracking or crazing, thus permitting leaking of the roof or siding surface in due time. The granules which have been most widely used are formed from rock, such as crushed slate and trap rock.

The felted fibrous substrate or membrane has been most commonly formed of rag, wood, paper, jute or other organic fibers on a machine similar to that used for manufacturing paper. The felt material is impregnated with asphalt, generally a blown petroleum derivative, by immersion, flowing, spraying, roller coating, or by a combination of such treatments, with excess saturant removed by scraping. The waterproofing character of the asphalt is the main attribute of the final product and the felt serves in a secondary status as a carrier, substrate and preserver of the asphalt.

While sheet materials based on organic felts possess excellent flexibility and tensile properties for good handling characteristics, they tend either to absorb or release moisture under varying climatic conditions. The resulting fluctuations in moisture content cause the felt to expand and contract, which often results in the occurrence of blisters due to steam occlusions. Organic fibers used in making suitable felt materials also tend to decay somewhat rapidly under variations in weather conditions and have drawbacks for other reasons, such as heat and hydro-dimensional instability which lead to distortions in the applied finished product.

Accordingly, it has been desirable to use inorganic fibers in preparing roofing felts, and particularly glass fibers, since such fibers possess excellent thermal and chemical stability. The desirability of an inorganic or glass fiber based felt is due to its peculiar properties and characteristics, including fire-resistance, low thermal expansion and contraction, insensitivity to relative humidity changes, and resistance to moisture absorption.

While glass fibers are more weather resistant then organic fibers, glass fiber mat based shingles coated or impregnated with a bituminous material have heretofore had serious application and handling problems, particularly when installed at or below a field ambient temperature of 40° F. (4.5° C.). Moreover, the inherent brittleness of most inorganic or glass fiber mat materials, which is less of a problem in milder climates, makes the product totally unsuitable in colder climates.

While glass fiber mat of better quality, particularly as to flexibility, may be prepared from continually drawn glass fibers cut from higher quality glass staple fiber, the cost of any resulting product increases significantly. To keep costs at an acceptable level, less expensive glass fibers and other inorganic fibers, such as glass wool and rock wool are desirable. However, inorganic fibers other than glass are even more brittle and flexibility is further impaired.

A number of attempts have been made to improve the flexibility, durability, and handling characteristics of inorganic fiber based mat products. The flexibility of such products can be enhanced by use of a special flexible glue or binder, but the resulting product has been found to have considerably lower breaking or tensile strength. Since glass fiber mats are composed of glass fibers held together by a binder material, attempts have been made to produce glass fiber mat having improved tensile strength and flexibility by varying the binder composition. A multitude of compositions comprising the asphalt or bitumen component combined with elastomer and thermoplastic polymer ingredients have been used as binders, but unfortunately, all have heretofore been deficient in one or more respects.

Bituminous coating or binder materials suitable for most roof service conditions have a glass transition point of approximately 32° F. (0° C.). Commonly, the bituminous materials are filled with an inorganic mineral stabilizer to improve their fire resistance, high temperature flow and weather resistance. These filled bituminous coatings, however, have a distinct tendency to shatter and break during normal application or handling or during maintenance traffic on the roof shingle surface. In particular, such binder materials provide glass mats which exhibit only acceptable tensile strengths at room temperature and at lower temperatures. Furthermore, the tensile strengths of such mats deteriorate appreciably when the mats are subjected to wet conditions, which can be encountered in their use in roofing as well as in siding or flooring products. In addition, these prior art mats have relatively poor flexibility resulting in buckling, creasing or cracking of the mats during use, handling or application as a base in asphalt roofing shingles or as a backing felt or base support for other sheet uses.

Accordingly, it is an object of the present invention to provide an inorganic fiber based mat composition, particularly, a glass fiber mat roofing felt, having improved flexibility, tensile strength, durability and handling properties, particularly at lower temperatures.

It is another object of this invention to provide an all weather glass mat based bituminous roofing felt which has acceptable physical properties, including flexibility and tensile strength, at both high and low temperature extremes, and which is capable of withstanding the stresses imposed by an outdoor environment, particularly the mechanical stresses due to the motion of the surface on which it is applied, natural atmospheric stresses (due to temperature, sun and the like) and artificial stresses, such as chemical and physical attacks.

SUMMARY OF THE INVENTION

It has now been found that the performance of any inorganic fiber based substrate used in the manufacture of building sheet products, particularly roofing shingles, can be remarkably improved in its application and end use in both high and low temperature environments, where the fibrous substrate or layer is first pre-coated with a polymer/bitumen composition prior to the application of any conventional asphalt or bitumen top coating composition. The product so manufactured can be stored and then applied at temperatures as low as 0° F. (−14° C.), depending upon the level of polymer modification selected. It has been found that the polymer/bitumen pre-coat acts upon the fiber substrate in such a way that the composite shingle exhibits improved cold weather handlability, and improved tear resistance and resistance to wind blow-off at low temperatures. As a result, the flexibility and tensile properties of the resulting mat or sheet product are enhanced, particularly for application and use in colder climates.

The polymer content of the bitumen/polymer pre-coat composition can range from about 3% to about 99%, preferably 10 to 20%, by weight with the remainder being a properly selected bituminous material. The polymer materials which are suitable for use in the invention may include many polymers, such as polyethylene vinyl acetate, poly (styrene butadiene-styrene) (SBS), poly (atactic) propylene (APP), and other elastomers and blends of these polymers that have sufficient thermodynamic compatibility with asphalt so as not to exhibit phase separation upon heated storage, but which impart their elastomeric characteristics to the asphalt without excessive viscosity increases.

As previously stated, the low temperature properties of the mat depend directly upon the polymer content of the precoat composition. The amount of elasticity, toughness, tenacity, flexibility, etc. arises from the rubber. Increased rubber content leads to an increase in these properties. As the polymer content of the pre-coat composition is increased, the percent elongation, impact resistance, toughness and tenacity are increased.

In the context of the present invention, all bituminous asphalt and coal tar materials are contemplated for use in the pre-coat composition, including "straight run" bitumens, which comprise the residual portion remaining after vacuum distillation of the petroleum, as well as oxidized bitumens obtained by blowing air at elevated temperatures through the asphalt.

Asphalt shall be selected such that when compounded with polymer, the viscosity will be low enough at application temperatures to penetrate the mat (approximately 500 centipose). The asphalt shall contain sufficient solubilizing oils to prevent gross phase separation of the uniformly dispersed rubber.

The polymer/bitumen pre-coat composition according to the invention is applied at a rate of about 0.75 lbs. to 17 lbs. per 100 feet, preferably about 9 lbs. to 11 lbs. per 100 square feet. The rate depends upon the market area to be served (i.e. climate), the nature of the filled coating asphalt and the flexibility, toughness and elasticity of the mat base.

The pre-coat composition of the present invention may be advantageously applied to all inorganic fiber substrates, but is most preferably applied to glass fiber mat. Other inorganic fiber materials which have been useful in preparing building mat or sheet material include mineral wool or rock wool. The glass or other inorganic fibrous material may comprise fibers of varying lengths and diameters, but most preferably ¼" length to 3" in length, 1 micron to 50 microns in diameter.

The pre-coat may be applied to the substrate in any known way, such as hot melt saturation.

Roof shingle mat prepared according to the invention exhibit the following advantageous properties:

A. Foldability in the cold, i.e. no cracks at temperatures as low as −20° Centigrade (−4° F.).

B. Elongation at break of about 3% to 100%.

C. Thermal behavior: after 5 hours at 190° Centigrade (374° F.), or below foldability in the cold are unchanged.

DETAILED DESCRIPTION OF THE INVENTION

The following detailed description of the invention pertains to a wet lay process for preparing a glass fiber mat based roofing shingle using the pre-coat composition and technique of the present invention. It will be understood that other processes known in the art, such as a dry lay process, may be used as well, as may other inorganic fibers for other similar end uses. Furthermore, the description is made using chopped bundles of glass fibers, although other forms of glass fiber, such as continuous strands may be used.

A glass fiber mat is formed by conventional wet lay process techniques using chopped bundles of glass fibers having a length of about ¼ inch to 3 inches and a diameter of about 10 to 20 microns. The bundles are added to an aqueous dispersant medium to form an aqueous slurry. Any suitable dispersant known in the art such as Katapol VP 532, may be used. The fibrous slurry is then agitated to form a workable dispersion at a suitable consistency and is thereafter passed to a mat forming machine. En route to the screen, the dispersion is diluted with water to a lower fiber concentration.

The fibers are collected at the wire screen in the form of a wet fiber mat and the excess water is removed by vacuum in the usual manner. Binder is applied and the wet mat is then dried and binder cured for application of the pre-coat composition. The precoating is accomplished by hot melt application on the roofing machine just prior to the final coating. In preparing the roofing shingle material, the pre-coated glass mat based substrate is then topcoated with a standard shingle binder coating comprising coating asphalt (190°–240° F. softening point) and mineral stabilizer.

The invention may be further understood by reference to the following examples, which are provided to illustrate the invention and should not be construed to limit the many variations and substitutions which may be made within the scope of the claims.

EXAMPLE 1

Preparation of Polymer/Bitumen Pre-Coat Compositions

Fifteen percent by weight of Phillips Solprene 475S (10% rubber, 5% oil) was added to saturant asphalt (130° F. R&B softening point, 62 dmm penetration 77/100/5). Agitation of the asphalt/polymer mix was accomplished by counter rotating vanes attached to a central spindle. A gas fired burner was used at the outside bottom of the tank to maintain temperature between 370° F. and 410° F. Mixing was accomplished in 45 minutes.

The elastomer pre-coating was discharged by gravity, spread across the moving glass mat and applied at a rate of 9 lb. to 13 lb. per 100 square feet to conventional glass mat.

EXAMPLE 2

Preparation of Roofing Shingles

The precoated glass mat (Example 1) was surfaced on both sides with a sand/talc mixture, cooled, and rolled into 180 ft. lenghts. Subsequently, this material was utilized to manufacture shingles in the usual manner. The 180 ft. length rolls were spliced into the roofing line and coated with a filled coating asphalt, surfaced, cooled, cut & packaged.

EXAMPLE 3

Physical Testing

Five samples of the roofing shingle material prepared in accordance with Example 2 using the pre-coating of Example 1 were:

1. Placed into a climate test chamber, controlled to a temperature of 40° F. and at the end of the 24+ hours period, and also at the end of a 48+ hours period, sample shingles were manipulated by several independent observers and compared, subjectively, for flexibility, stiffness, brittleness, and tearing propensity with that obtained on shingles manufactured using the standard construction on glass mat. All of the observers detected a vast improvement in each of the characteristics over the standard glass mat based shingle.

Segments of the above conditioned materials were subjected to a standardized cold temperature flexural bend test. The experimental material out performed the standard glass mat shingle by a factor of two.

Test decks were constructed and conditioned at 40° F. These decks were placed in a "wind tunnel" and tested for 15 minutes at 40° F. under an air stream with a velocity up to 60 miles per hour. The standard glass mat bituminous shingles failed by loss of tabs, while the invention product remained intact.

EXAMPLE 4

Long-Term Weatherability Tests

About 250 samples of the roofing shingle material prepared in accordance with Example 2 again using the precoat formulation of Example 1 were tested for long term weatherability as follows:

Standardized roofing test deck panels were constructed and placed in a controlled exposure area (Weathering Farm) at a 45° angle facing south, south west in the Houston, Tex. area. These materials are in excellent condition after almost two years exposure.

Standardized shingle roofing test deck panels were constructed and placed on exposure in an industralized north east, U.S.A. urban area. These shingles are in a good condition compared to control shingles.

An experimental production trial run at the subject material was shipped to St. Paul, Minn. and stored in an unheated warehouse. When thoroughly cold (exterior temperatures were from −30° F. to 20° F.), the shingles were applied to a building's roof by a commercial roofing applicator. The temperature at time of application hovered around 5° F. The experimental shingles were applied with no problems and were vastly superior, in application performance, to standard glass mat based bituminous shingles.

While the invention has been described with reference to certain embodiments thereof, it will be understood by those skilled in the art that other obvious embodiments as well as certain changes and modifications within the scope of the teachings of this specification are contemplated. Accordingly, the invention shall be limited only by the proper scope of the appended claims.

We claim:

1. A building sheet product comprising an inorganic fiber based mat precoated with a polymer/bitumen composition prior to the application of an conventional asphalt topcoating, wherein the polymer is an elastomer.

2. A product according to claim 1 wherein the building sheet product is a roofing shingle.

3. A roofing shingle according to claim 2 wherein the inorganic fiber is glass fiber.

4. A roofing shingle according to claim 3 wherein the polymer content of the polymer/bitumen precoat composition ranges from 3–99%.

5. A roofing shingle according to claim 3 wherein the polymer is selected from the group consisting of polyethylene vinyl acetate, poly (styrene-butadiene-styrene), poly (atactic) propylene, blends of these polymers and other elastomers having sufficient thermodynamic compatibility with the said bitumen component so as not to exhibit phase separation upon heated storage and which impart their elastomeric characteristic to the asphalt without excessive viscosity increases.

6. A roofing shingle according to claim 4 wherein the pre-coating is applied at a rate of about 5 lbs. to 15 lbs. per 100 square feet.

7. A roofing shingle according to claim 4 wherein the topcoat composition comprises, blown, filled asphalt coating.

8. A process for manufacturing an inorganic fiber based roofing shingle which comprises pre-coating the inorganic fiber based substrate with a polymer/bitumen composition prior to the application of an asphalt topcoat, wherein the polymer is an elastomer.

9. A roofing shingle according to claim 4 wherein the polymer content of the polymer/bitumen precoat composition ranges from 10 to 15%.

10. A roofing shingle according to claim 6 wherein the pre-coating is applied at a rate of about 9 lbs to 11 lbs. per 100 square feet.

* * * * *

UNITED STATES PATENT AND TRADEMARK OFFICE
CERTIFICATE OF CORRECTION

PATENT NO. : 4,871,605

DATED : October 3, 1989

INVENTOR(S) : Charles A. Pagen et al.

It is certified that error appears in the above-identified patent and that said Letters Patent is hereby corrected as shown below:

Col. 6, line 19, delete "conventional".

Col. 6, line 37, "characteristic" should read --characteristics--.

Signed and Sealed this

Twenty-eighth Day of August, 1990

Attest:

HARRY F. MANBECK, JR.

Attesting Officer

Commissioner of Patents and Trademarks